Oct. 22, 1968  W. H. KINARD ET AL  3,407,304
MICROMETEOROID PENETRATION MEASURING DEVICE
Filed Nov. 19, 1965
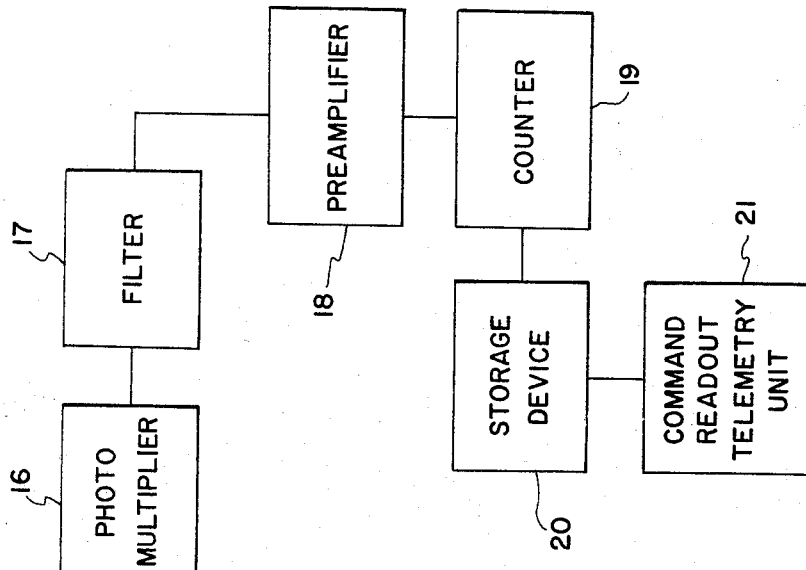
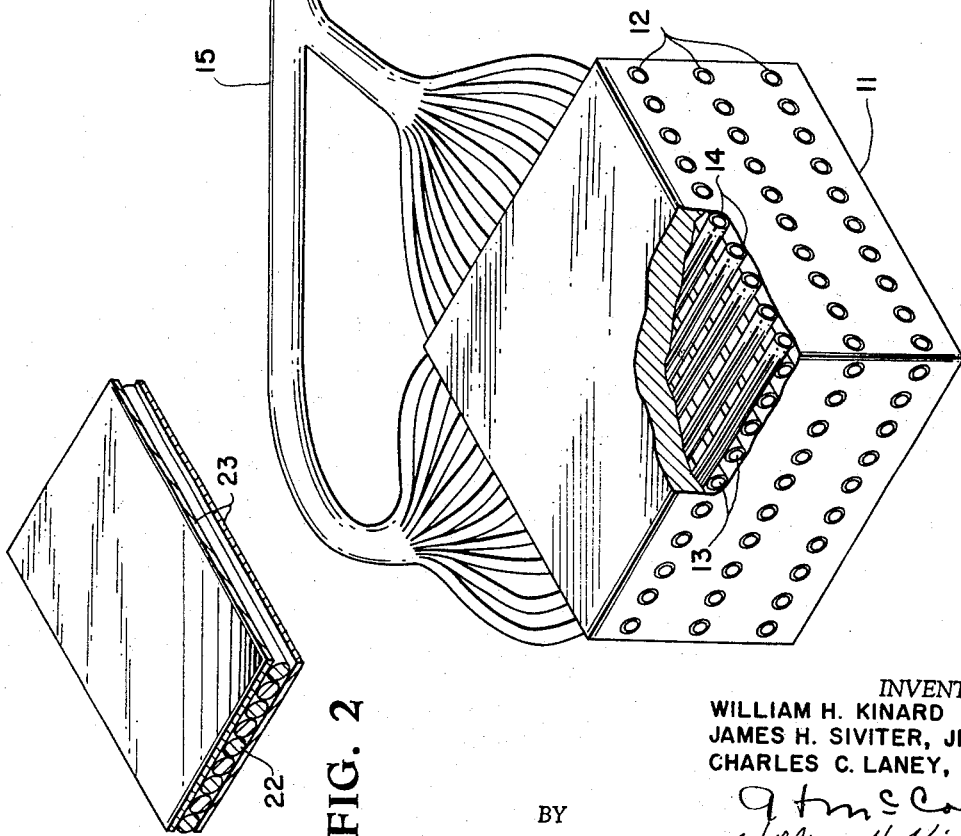
INVENTORS
WILLIAM H. KINARD
JAMES H. SIVITER, JR.
CHARLES C. LANEY, JR.
BY
ATTORNEYS

United States Patent Office 3,407,304
Patented Oct. 22, 1968

3,407,304
MICROMETEOROID PENETRATION MEASURING DEVICE
William H. Kinard, Williamsburg, James H. Siviter, Jr., Hampton, and Charles C. Laney, Jr., Portsmouth, Va., assignors to the United States of America as represented by the Administrator of the National Aeronautics and Space Administration
Filed Nov. 19, 1965, Ser. No. 508,873
10 Claims. (Cl. 250—227)

The invention described herein may be manufactured and used by or for the Government of the United States of America for governmental purposes without the payment of any royalties thereon or therefor.

The invention relates generally to a device for detecting micrometeoroids in space and more specifically concerns a device for measuring the depths of penetration of micrometeoroids into a material specimen placed in space.

The general purpose of this invention is to provide a device for measuring the micrometeoroid depths of penetration into various structural materials such as metals, ceramics, and plastics when they are exposed to a space environment. These measurements are needed to determine the magnitude of the hazard of micrometeoroid particles impacting spacecraft. If the hazard is found to be great, then this invention can be used to determine which materials should be used to minimize the impact damage.

In the past, there have been many devices used to detect micrometeoroids in space. Acoustical microphone detectors have been mounted on plates of structural materials exposed to the space environment to record the frequency of impacting micrometeoroid particles. Wire grids exposed to the space environment with means for detecting breaks in the wires caused by micrometeoroid particle impacts have been used to establish some indication of the micrometeoroid hazard. Another device used to study the hazard of micrometeoroid particle impacts consists of a light-sensitive cell placed in an opaque cavity with a material specimen placed across the opening of the cavity. If the material specimen is completely penetrated, the light cell records ambient light transmitted through the penetrated hole. Still another device consists of a thin wall pressurized can with a pressure switch. If the can is punctured by a micrometeoroid, the switch is actuated by the resulting loss of pressure. Yet another device makes use of a very fine photo-engraved grid mounted on the back surface of an exposed metal specimen. When the specimen is completely penetrated by a micrometeoroid, the engraved grid is broken, thus altering the electrical resistance of the grid. A further device consists of a sandwich of material having alternate layers of a very thin conductor material and a dielectric material. An electrical circuit monitors the effective electrical resistance between the layers of conductors. If the dielectric is penetrated by a micrometeoroid the resulting ionization alters the electrical resistance between the layers of conductors.

The main disadvantage of the acoustical microphone detectors is the fact that they fail to give a positive indication of the impact damage such as the depth of penetration. There is an indication that they may be momentum or energy sensitive, but calibrations under micrometeoroid impact conditions would be very difficult if not impossible. The principal disadvantage of the wire grid device is the difficulty in using the data obtained from wire breaks to predict penetration of spacecraft structures. Another disadvantage of the wire grid device is the fact that once the grid is broken by a micrometeoroid impact, it is useless for recording additional impacts. The principal disadvantage of the light-sensitive cell is that only very small surface areas can be instrumented and consequently the quantity of data which can be obtained is limited. The pressurized can device has the same disadvantage as the wire grid device insomuch as after one micrometeoroid puncture, it is useless for recording additional punctures. In addition, the pressurized can device fails to record any impacts that do not result in complete penetration. These same disadvantages also apply to the photo-engraved grid device. The same disadvantages apply to the sandwich detector plus the disadvantage that the sandwich detector can test only dielectric materials.

It is therefore an object of this invention to provide a device for measuring the depths of penetration of micrometeoroids into a material specimen placed in space.

Another object of this invention is to provide a device for detecting micrometeoroid impacts which is not rendered useless after one micrometeoroid impact.

Still another object of this invention is to provide a micrometeoroid detecting device which will furnish data suitable for predicting micrometeoroid penetration of spacecraft structures.

A still further object of this invention is to provide a micrometeoroid detecting device in which large surface areas can be instrumented and consequently the quantity of data which can be obtained is large.

Yet another object of this invention is to provide a micrometeoroid detecting device which is useful in evaluating all types of materials for space flight.

In accomplishing these and other objects, this invention makes use of several layers of optical fibers embedded in a material specimen at various selected depths to detect the depths of penetration of impacting micrometeoroids into the material specimen. The specimen can be any material (metal, plastic or ceramic as long as it is opaque) in which it is physically possible to embed layers of optical fibers. After the optical fibers of each layer emerge from the edge of the specimen they are bundled into a single bundle and run to the face of a light detecting device such as a photomultiplier. If and when a micrometeoroid particle impacts the specimen and penetrates to a depth greater than the depth of a layer of embedded optical fibers a crater will be formed in the specimen and some fibers will be broken. For a short time after the formation of the crater (a fraction of a millisecond) the crater is filled with ionized material of the specimen and the impacting particle. The light from this ionized material enters the broken optical fibers and is transmitted along the fibers to the light-sensitive detector. The detector, after receiving the light pulse, generates an electrical voltage signalling the fact that the specimen has been impacted and penetrated to a depth at least greater than the depth of the optical fibers. This voltage from the light detector is supplied to a preamplifier to be amplified and shaped to make it storable in a counter storage unit, which in turn will be interrogated when desired and the interrogated information telemetered to ground receiving stations. If continuous telemetry is available the signal from the preamplifier may be fed directly into a telemetry unit for transmission.

After the ionization decays, the light detector ceases generating a voltage and is ready to detect another micrometeoroid impact. A portion of the optical fibers broken by the crater formation will be severed from the light detector and incapable of signalling the detector if they are impacted and penetrated by another particle; however, an extremely large number of impacts would be required to render any appreciable portion of the specimen inactive. The spacing between fibers is selected such that the width of the crater formed at the depth of the fibers will be greater than the fiber spacing and the breaking of at least one fiber insured with sufficient confidence. The fiber diameter and spacing are also such that the strength and integrity of the target specimen at the depth of the fibers is not appreciably altered. Any number of layers of optical fibers can be embedded in the target specimen at the desired depths; however, a separate electronic detecting system must be used for each layer of optical fibers.

Other objects and advantages of this invention will further become apparent hereinafter and in the drawings, in which:

FIG. 1 is a schematic drawing of a preferred embodiment of this invention; and

FIG. 2 is a schematic drawing of an alternate embodiment of this invention.

In describing the embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the embodiment of the invention shown in FIG. 1, the number 11 designates a section of the specimen material that is to be exposed to the space environment. The specimen 11 can be any material such as metal, plastic, or ceramic as long as it is opaque. Another restriction on specimen 11 is that it be physically possible to embed layers of optical fibers in it. Embedded in specimen 11 at different predetermined depths are layers of optical fibers 12 which can be made from any highly transparent material such as glass or clear plastics. All optical fibers placed at each respective depth are divided into two groups 13 and 14. The fibers in group 13 run parallel to each other and the fibers in group 14 run parallel to each other and perpendicular to the fibers in group 13. The fibers 12 can best be embedded in the specimen 11 by cutting specimen 11 into layers and embedding the fibers between the layers. After the fibers for each depth emerge from the edge of the specimen 11 they are bundled into a single bundle 15 and run to the face of a photomultiplier 16. The output from photomultipliers 16 is supplied to a filter 17. Filter 17 is a high pass filter which will filter off D.C. and slow-varying A.C. Only fast-varying A.C. signals will pass through filter 17. The output from filter 17 is applied to a preamplifier 18 which amplifies the signal and conditions it before it is applied to a counter 18. The preamplifier 18 includes a monostable multivibrator to condition the signal. Consequently, every signal applied through filter 17 is counted by counter 19. This count on counter 19 is stored in a storage device 20, and is transmitted to earth by a command readout telemetry unit 21. Even though only one electronic circuit has been described, it should be understood that there will be a separate electronic circuit for each of the layers of optical fibers 12. Photomultiplier 16, filter 17, preamplifier 18, counter 19, storage device 20, and command readout telemetry unit 21 are all state-of-the-art devices and are therefore not disclosed in detail in this specification.

The micrometeoroid penetration device disclosed in FIG. 1 can be launched into space in the nosecone of a rocket vehicle. It can either be placed in orbit about the earth or possibly in the earth-moon system or fired deep into space as a probe depending on the data desired. During the launch the rocket nosecone will protect the penetration measuring device from the launch environment. Once in space, the nosecone will be ejected and the specimen exposed to the space environment for detecting micrometeoroid impacts and penetrations.

In operation, the specimen 11 will be subjected to the space environment. If and when a micrometeoroid particle impacts the specimen 11 and penetrates to a depth greater than the depth of a layer of embedded fibers 12, a crater will be formed and some fibers will be broken. For a short time after the formation of the crater, the crater is filled with ionized material of the specimen and the impacting particle. The light from this ionized material enters the broken optical fibers and is transmitted along the fiber to photomultiplier 16. Photomultiplier 16, after receiving the light pulse, generates an electrical voltage signalling the fact that the specimen has been impacted and penetrated to a depth at least greater than the optical fibers. This voltage from photomultiplier 16 is supplied through filter 17 to preamplifier 18 to be amplified and shaped to make it storable in counter 19. The count in counter 19 is stored in storage device 20 where it can be transmitted to earth by telemetry unit 21 at any time desired. Filter 17 will only pass voltages with sharp increases. It will eliminate all D.C. or slow-varying A.C. voltages. Consequently, light picked up by the optical fibers from the stars or sun will be filtered out and will not be passed through filter 17. From the counts in counters 19, the depths of penetration of the micrometeoroids that impacted specimen 11 can be determined. For example, suppose that there are three layers of optical fibers 12 embedded in specimen 11, then there will be a counter 19 for each of these three layers. If after specimen 11 has been exposed to a space environment, the counter 19 for the first level has a count of 25 in it, the counter 19 for the second layer has a count of 14 in it and the counter 19 for the third level has a count of 5 in it, then this means that 5 micrometeoroids penetrated to the third level, 9 micrometeoroids penetrated to the second level and 11 micrometeoroids penetrated to the first level.

Referring now to FIG. 2, there is shown an alternate embodiment of this invention. In this embodiment, .002 of an inch diameter optical fibers 22 are laminated between two sheets of aluminum foil 23 that are .001 of an inch thick. Both ends of fibers 22 are connected to an electronic circuit identical to the one shown in FIG. 1. Consequently, when the embodiment shown in FIG. 2 is penetrated by a micrometeoroid, photomultiplier 16 produces a signal which is passed through filter 17 and preamplifier 18, and then counted by counter 19. The embodiment in FIG. 2 will not measure the different depths of penetration of micrometeoroids; however, it will detect the presence of micrometeoroids having penetration capability above some predetermined amount which is determined by the strength of the tin foil 23 and fibers 22 in FIG. 2.

The advantages of this invention are that it can instrument very large surface areas of metals, plastics, and ceramics; that it can detect penetrations to various depths in the target specimen rather than only complete penetrations; that it is not rendered useless by a single or a few impacts; and that it is a relatively simple, rugged, and reliable system.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention, as defined in the subjoined claims. Each layer of optical fibers 12 in FIG. 1 can consist of a single group of parallel fibers instead of two groups. If a single group is used, then it is necessary that both ends of each fiber be connected to photomultiplier 16.

What is claimed is:

1. A micrometeoroid penetration measuring device comprising: a material specimen placed in a space environment such that a surface of the specimen is exposed to the micrometeoroid hazard; layers of optical fibers embedded in said material specimen at different predetermined depths from said surface; means for each of said layers of optical fibers for detecting any sudden changes in light that is transmitted through said optical fibers; and means for counting said sudden changes detected by each of said detecting means whereby when micrometeoroid particles impact said specimen the depths of penetration of the micrometeoroid particles can be determined.

2. A micrometeoroid penetration measuring device in accordance with claim 1 wherein each of said layers of optical fibers consist of a first group of optical fibers parallel to each other and a second group of optical fibers parallel to each other and perpendicular to said first group of optical fibers.

3. A micrometeoroid penetration measuring device in accordance with claim 1 wherein said means for detecting any sudden changes in light includes a light-sensitive detector for changing the light into electrical signals and filter means connected to said light-sensitive detector for passing only sudden changes in said electrical signals.

4. A device for detecting the micrometeoroid in a space environment that have penetration capabilities above a predetermined level comprising: a material specimen placed in space such that one of its surfaces is exposed to the micrometeoroid hazard; a layer of optical fibers embedded in said specimen at a depth below said surface such that only micrometeoroids having momentums above said predetermined level will penetrate said specimen beyond said depth; a light-sensitive detector means for sensing the light passed through said optical fibers and changing it into an electrical signal; and means connected to said light-sensitive detector means for counting the sudden changes in said electrical signal whereby the count of said sudden changes is the number of times that micrometeoroids penetrate said specimen beyond said depth.

5. A device for detecting micrometeoroids in accordance with claim 4 wherein said means for counting the sudden changes in said electrical counts includes a filter.

6. A plurality of detecting devices in accordance with claim 4 with said material specimen being common to all detecting devices and with the layer of optical fibers for each device being embedded at a different depth from said surface of said specimen whereby the penetration depths of the micrometeoroids that strike said specimen can be determined.

7. A device for detecting micrometeoroids in a space environment that have penetration capabilities above a predetermined level comprising: a layer of optical fibers laminated between two thin pieces of material such that only micrometeoroids that have momentums above said predetermined level will penetrate said layer of optical fibers; and means for counting the sudden changes of light that are transmitted through said optical fibers whereby the count of sudden changes of light represents the number of micrometeoroids that have penetration capabilities above said predetermined level.

8. A device for detecting micrometeoroids in accordance with claim 7 wherein said means for counting the sudden changes of light includes means for changing the sudden changes of light into sudden changes in an electrical signal and means for counting the sudden changes in the electrical signal.

9. A micrometeoroid penetration measuring device comprising: a material specimen placed in a space environment such that a surface of the specimen is exposed to the micrometeoroid hazard; layers of optical fibers embedded in said material specimen at different predetermined depths from said surface; and means for each of said layers for counting the sudden changes in light that is transmitted through said optical fibers in each layer whereby the depths of penetration of micrometeoroids into said material specimen can be determined.

10. A micrometeoroid penetration measuring device in accordance with claim 9 wherein said means for counting the sudden changes in light that is transmitted through said optical fibers includes means for changing the sudden changes in light into sudden changes in an electrical signal and means for counting the sudden changes in the electrical signal.

References Cited

UNITED STATES PATENTS

| | | | |
|---|---|---|---|
| 3,150,356 | 9/1964 | Newman | 250—227 |
| 3,265,928 | 8/1966 | Nishino | 315—169 X |
| 3,277,724 | 10/1966 | Lundeberg | 74—432 |
| 3,307,407 | 3/1967 | Berg et al. | 73—170 X |
| 3,324,388 | 6/1967 | Davison | 73—170 X |

JAMES W. LAWRENCE, *Primary Examiner.*

V. LAFRANCHI, *Assistant Examiner.*